United States Patent
Biran et al.

(10) Patent No.: US 7,496,108 B2
(45) Date of Patent: Feb. 24, 2009

(54) METHOD FOR DYNAMIC MANAGEMENT OF TCP REASSEMBLY BUFFERS

(75) Inventors: Giora Biran, Zichron-Yaakov (IL); Mark Epshtein, Kiryat Motzkin (IL); Vadim Makhervaks, Yokneam (IL); Alexander Mesh, Haifa (IL); Tal Sostheim, Kiryat Tivon (IL); Shaul Yifrach, Haifa (IL)

(73) Assignee: International Business Machines Corporation, Armonk, NY (US)

(*) Notice: Subject to any disclaimer, the term of this patent is extended or adjusted under 35 U.S.C. 154(b) by 928 days.

(21) Appl. No.: 10/752,921

(22) Filed: Jan. 7, 2004

(65) Prior Publication Data

US 2005/0147100 A1  Jul. 7, 2005

(51) Int. Cl.
 *H04L 12/28* (2006.01)
 *H04L 12/56* (2006.01)
(52) U.S. Cl. .................................... 370/413; 370/235
(58) Field of Classification Search ................. 370/230, 370/235, 412–418
See application file for complete search history.

(56) References Cited

U.S. PATENT DOCUMENTS

| | | | | |
|---|---|---|---|---|
| 5,798,976 A | * | 8/1998 | Arimoto | 365/222 |
| 6,938,134 B2 | * | 8/2005 | Madany | 711/161 |
| 2003/0137936 A1 | * | 7/2003 | Cornet et al. | 370/230 |
| 2004/0047361 A1 | * | 3/2004 | Fan et al. | 370/411 |

* cited by examiner

*Primary Examiner*—Ronald Abelson
(74) *Attorney, Agent, or Firm*—Ira D. Blecker; Hoffman Warnick LLC

(57) ABSTRACT

A method for dynamic management of Transmission Control Protocol (TCP) reassembly buffers in hardware (e.g., in a TCP/IP offload engine (TOE)). The method comprises: providing a plurality of data blocks and an indirect list; pointing, via entries in the indirect list, to allocated data blocks in the plurality of data blocks that currently store incoming data; if a free data block in the plurality of data blocks is required for the storage of incoming data, allocating the free data block for storing incoming data; and, if an allocated data block in the plurality of data blocks is no longer needed for storing incoming data, deallocating the allocated data block such that the deallocated data block becomes a free data block.

17 Claims, 6 Drawing Sheets

METHOD FOR DYNAMIC MANAGEMENT OF TCP REASSEMBLY BUFFERS

BACKGROUND OF THE INVENTION

1. Technical Field

The present invention is related to data transfer. More particularly, the present invention provides a method for dynamic management of Transmission Control Protocol (TCP) reassembly buffers in hardware (e.g., in a TCP/IP offload engine (TOE)).

2. Related Art

One of the challenges of efficient TCP implementation in hardware is the reassembly of an original byte stream from out-of-order TCP segments using reassembly buffers. Management and flexibility of the reassembly buffers plays a significant role in the TCP implementation.

One known solution for the reassembly of out-of-order TCP segments is the use of statically allocated reassembly buffers. Although this solution certainly has performance advantages, its lack of scalability, flexibility, and waste of expensive memory resources, makes such a solution unacceptable for large-scale implementations.

There is a need, therefore, for a method and system for the dynamic management of TCP reassembly buffers in hardware.

SUMMARY OF THE INVENTION

The present invention provides a method for the dynamic management of TCP reassembly buffers in hardware. Dynamic memory management significantly improves the flexibility and scalability of available memory resources. The major challenge of dynamic memory management of TCP reassembly buffers in hardware, however, is to reduce its associated performance penalty and to bring its performance as close as possible to the performance achieved by static memory management methods. The present invention accomplishes these goals.

The present invention provides a method for flexible dynamic memory management of TCP reassembly buffers, allowing efficient hardware implementation. In addition, the method of the present invention allow combined dynamic and static memory management using the same hardware implementation. The decision to use dynamic or static memory management is done on a per reassembly buffer basis to further increase the efficiency of the hardware implementation.

A first aspect of the present invention is directed to a method for dynamically managing a reassembly buffer, comprising: providing a plurality of data blocks and an indirect list; pointing, via entries in the indirect list, to allocated data blocks in the plurality of data blocks that currently store incoming data; if a free data block in the plurality of data blocks is required for the storage of incoming data, allocating the free data block for storing incoming data; and, if an allocated data block in the plurality of data blocks is no longer needed for storing incoming data, deallocating the allocated data block such that the deallocated data block becomes a free data block.

A second aspect of the present invention provides a method for storing out-of-order data segments in a reassembly buffer, comprising: providing a plurality of data blocks and an indirect list having a plurality of entries; providing each data segment with a sequence number, wherein the sequence number specifies which entry in the indirect list is to be associated with the data segment; determining if any of the plurality of data blocks has already been allocated to the specified entry in the indirect list; if a data block has already been allocated to the specified entry, storing the data segment in the allocated data block; and if a data block has not already been allocated to the specified entry, allocating a free data block for the storage of the data segment, and storing the data segment in the allocated free data block.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

The present invention provides a method and system for flexible dynamic memory management of TCP reassembly buffers.

Figure 1:
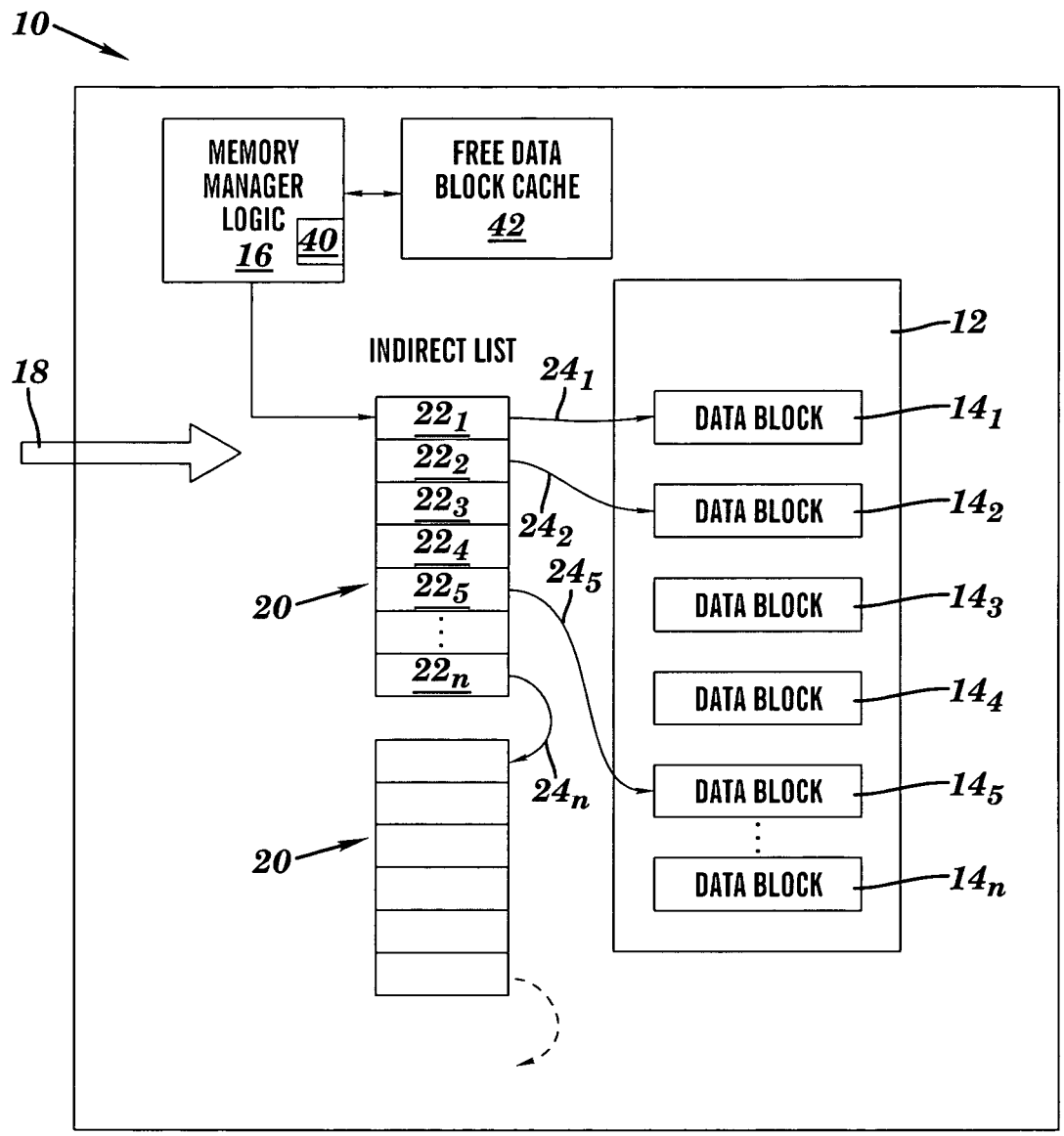
FIG. 1 illustrates a reassembly buffer in accordance with the present invention.

A reassembly buffer 10 in accordance with the present invention is illustrated in FIG. 1. The reassembly buffer 10 includes a reassembly memory region 12 comprising a plurality of constant size pages (e.g., 4k), called data blocks 14, available to the reassembly buffer 10, and memory manager logic 16 for controlling operation (e.g., data block allocation/deallocation) of the reassembly buffer 10. Each data block 14 comprises a memory block (e.g., a continuous chunk of memory) that is used to hold incoming TCP data 18 to be reassembled. The reassembly buffer 10 is defined by an indirect list 20. Typically, a plurality of reassembly buffers 10 are provided in a data transfer system.

The indirect list 20 is a contiguous memory block that holds a plurality (e.g., 256) of pointers to the data blocks 14 and, if needed, a pointer to another indirect list. Given data blocks 14 having a size 4k, and 256 pointers in the indirect list 20, for example, the reassembly buffer 10 is capable of holding up to 1 Mb of incoming TCP data 18. By pointing to another indirect list 20, however, which may itself contain a pointer to yet another indirect list 20, and so on, a chain of indirect lists 20 is created. As such, the scalability and maximum size of the reassembly buffer 10 can be dynamically increased as needed.

During initialization of a reassembly buffer 10, the reassembly buffer 10 is provided with an empty indirect list 20. Either during initialization or run time, each reassembly buffer 10 can be upgraded to include more than one indirect list 20, which are chained together as detailed above.

As stated above, the reassembly buffer 10 has one (or more) indirect lists 20 associated with it. Each entry 22 in the indirect list 20 can be either free or allocated. An entry 22 in the indirect list 20 is allocated if it points to a data block 14 holding data to be reassembled, or if it points to another indirect list 20. For example, referring to FIG. 1, the entries $22_1$, $22_2$, and $22_5$ are allocated because they each contain a pointer $24_1$, $24_2$, and $24_5$ to data blocks $14_1$, $14_2$, and $14_5$, respectively, holding data to be reassembled. The entry $22_n$ is allocated because it contains a pointer $24_n$ to another indirect list 20, while the entries $22_3$, $22_4$ and $22_6$-$22_{n-1}$ are not allocated and are therefore free.

Several bits of each entry 22 in the indirect list 20 can be used to carry in-place control information. For example, one bit of each entry 22 in the indirect list 20 can be used to provide an allocated/free indication, which indicates whether the entry 22 holds a pointer 24 to an allocated data block 14 or another indirect list 20, or whether the entry 22 is free and is part of a free list (discussed below), respectively. Another entry 22 in the indirect list 20 can be used to provide a DataBlock/IndirectList indication, which indicates whether the entry 22 holds a pointer 24 to an allocated data block 14 or to another indirect list 20, respectively.

Figure 2:
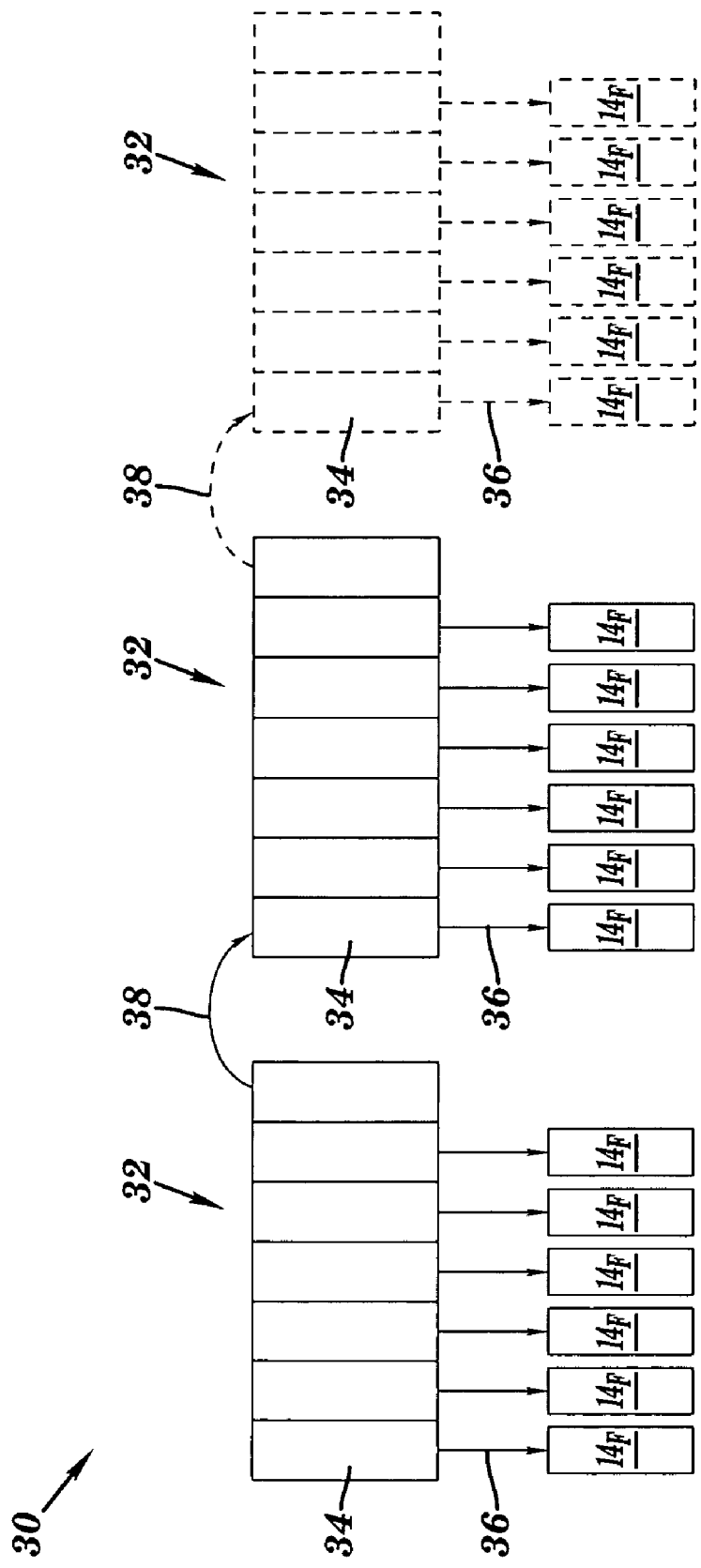
FIG. 2 illustrates a free list shared between all of the reassembly buffers in the system.

The reassembly buffer 10 also has access to a free list 30, illustrated in FIG. 2, that is shared between all of the reassembly buffers 10 in the system. The free list 30 provides access to a pool of free data blocks $14_F$ that are not consumed by any reassembly buffer 10 and that can be shared among the reassembly buffers 10 as data blocks 14 or indirect lists 20, upon request. During system initialization, the free list 30 is initialized to hold all free data blocks $14_F$ available to the reassembly buffers 10 in the system. The free list 30 can thus be considered a system resource pool of free data blocks $14_F$. It should be noted that upon reassembly buffer 10 deallocation, the empty indirect list(s) 20 are also returned to the system resource pool (i.e., to the free list 30).

The free list 30 is a chain of indirect lists 32 implemented as a stack. The entries 34 in each indirect list 32, with the exception of the last entry 34 in each indirect list 32, contain a pointer 36 to a free data block $14_F$ that is not consumed by any reassembly buffer 10. The last entry 34 in each indirect list 32 includes a pointer 38 to the next indirect list 32 in the free list 30.

The free list 30 is defined using two pointers: a tail pointer (FLTailPtr) and a head pointer (FLHeadPtr). The tail pointer (FLTailPtr) is used during the data block deallocation process to point to the next entry 34 in the free list 30 that will be used to point to the next deallocated (i.e., "freed") data block $14_F$. The header pointer (FLHeadPtr) is used during the data block allocation process to point to the entry 34 in the free list 30 that points to the next available free data block $14_F$ to be allocated.

Two basic memory management operations are performed in accordance with the present invention: allocation of a free data block $14_F$ from the free list 30—either to become an allocated data block 14 or an indirect list 20; and, deallocation of an allocated data block 14 to the free list 30—either to become a free data block $14_F$ or an indirect list 32. These operations are used to load incoming TCP data 18 into the reassembly buffers 10, or to transfer the reassembled TCP data 18 from the allocated data blocks 14 to destination buffers. The data block allocation process will be discussed in greater detail below with regard to FIGS. 3-6. The data block deallocation process will be discussed in greater detail below with regard to FIGS. 7-10.

Figure 3:
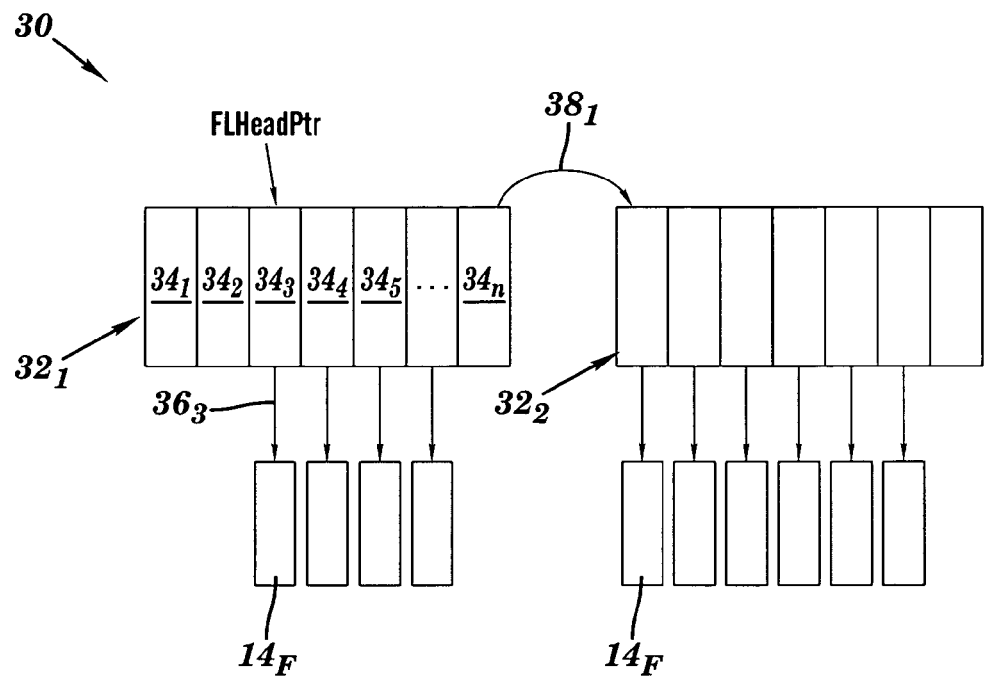
FIGS. 3-4 illustrate the allocation of a free data block from the free list, wherein the head pointer (FLHeadPtr) points to an entry in the middle of an indirect list of the free list.

In the exemplary free list 30 shown in FIG. 3, which is shown for clarity as including only two indirect lists $32_1$ and $32_2$, the free data blocks $14_F$ associated with the entries $34_1$, $34_2$ in the indirect list $32_1$ have already been allocated to a reassembly buffer 10 for the storage of TCP data 18 (FIG. 1). To this extent, the head pointer (FLHeadPtr) now points to the entry (i.e., entry $34_3$) in the indirect list $32_1$ associated with the next available free data block $14_F$ to be allocated to a reassembly buffer 10 for the storage of TCP data 18.

Figure 4:
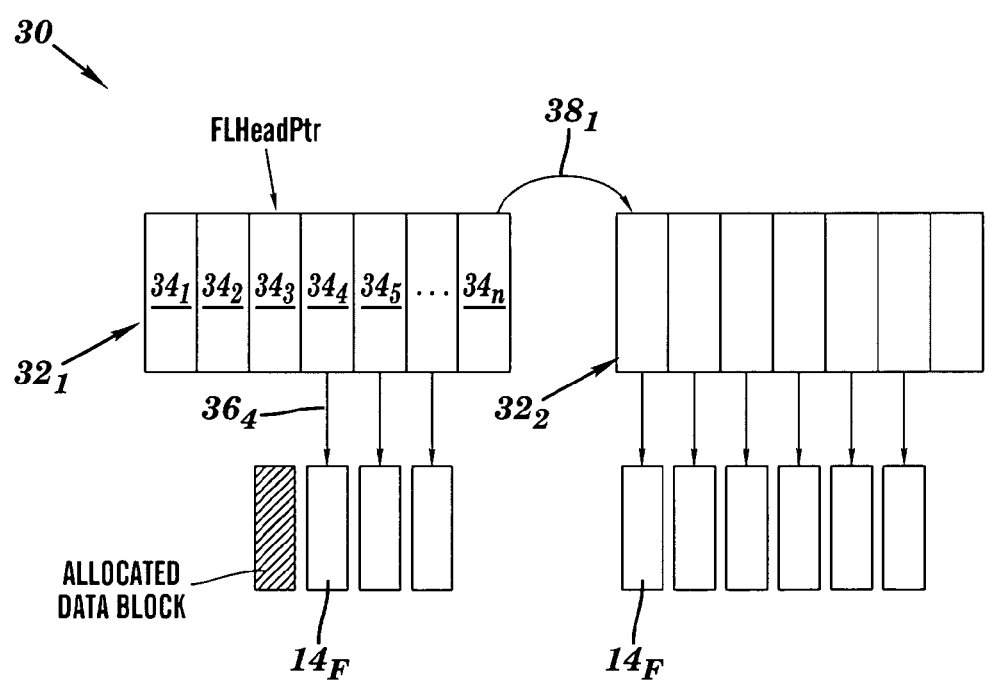

The allocation process can follow several different scenarios. One such scenario is shown in FIG. 3, where the head pointer (FLHeadPtr) points to an entry (i.e., entry $34_3$) that is in the middle of an indirect list (i.e., indirect list $32_1$). In this case, the free data block $14_F$ referred to by entry $34_3$ via pointer $36_3$ is the next free data block $14_F$ to be allocated. As shown in FIG. 4, after the free data block $14_F$ referred to by entry $34_3$ via pointer $36_3$ has been allocated, the head pointer (FLHeadPtr) is moved to point to the next entry $34_4$ in the same indirect list $32_1$. In general, this scenario is followed if the head pointer (FLHeadPtr) points to an entry (i.e., $34_1$-$34_{n-1}$) that is not the last entry (i.e., $34_n$) in an indirect list 32.

Figure 5:
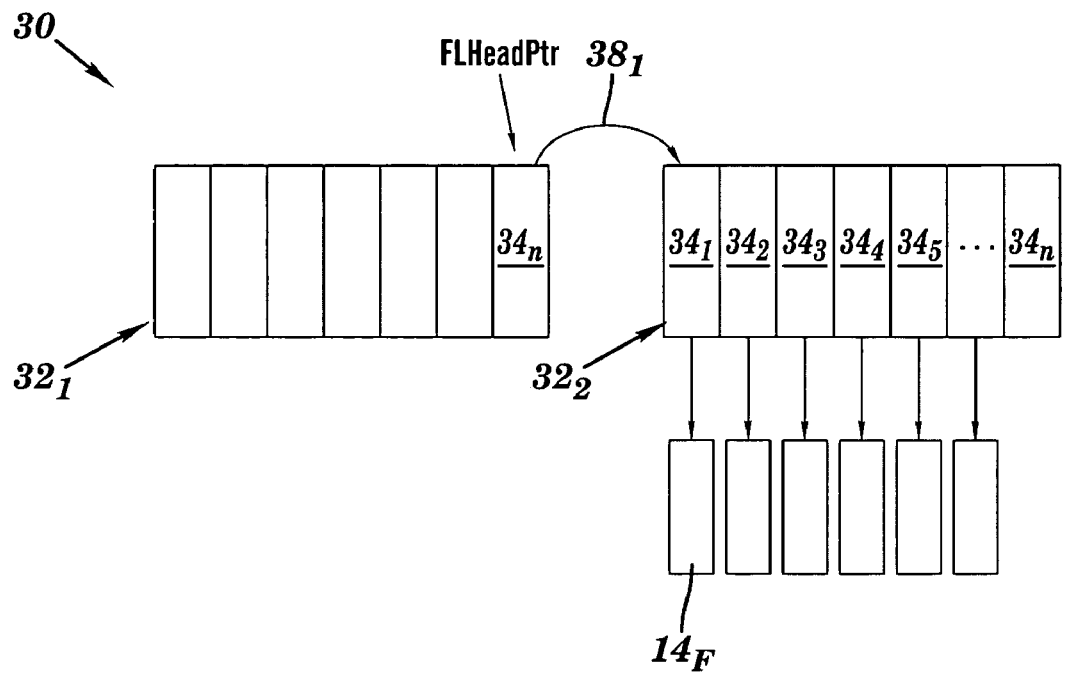
FIGS. 5-6 illustrate the allocation of a free data block from the free list, wherein the head pointer (FLHeadPtr) points to the last entry of an indirect list of the free list.
Figure 6:
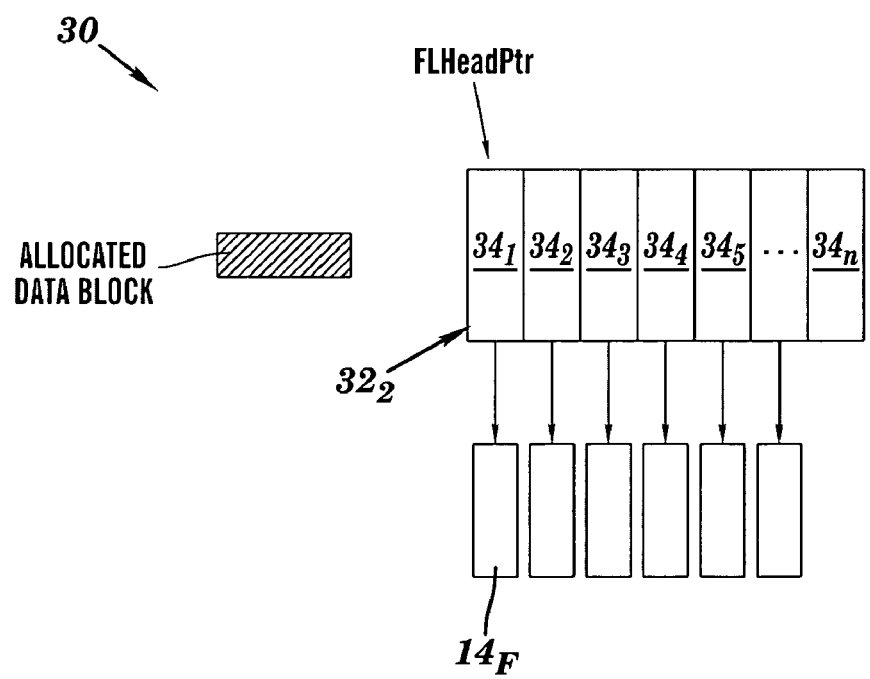

Referring now to FIG. 5, a second scenario is illustrated. In this scenario, the head pointer (FLHeadPtr) points to the last entry (i.e., entry $34_n$) in the indirect list $32_1$ of the free list 30. This entry in the indirect list $32_1$ is used to point, via pointer $38_1$, to the next indirect list (i.e., indirect list $32_2$) in the chain of indirect lists 32 forming the free list 30. In this case, the indirect list $32_1$ itself becomes the next free data block to be allocated to a reassembly buffer 10 for the storage of TCP data 18. As shown in FIG. 6, after the indirect list $32_1$ has been allocated, the head pointer (FLHeadPtr) is moved to point to the first entry $34_1$ in the next indirect list $32_2$ in the chain of indirect lists 32 forming the free list 30.

As mentioned above, the free list 30 is defined using two pointers: a tail pointer (FLTailPtr) and a head pointer (FLHeadPtr). The tail pointer (FLTailPtr) is used during the data block deallocation process to point to the next entry 34 in the free list 30 that will be used to point to the next deallocated (i.e., "freed") data block $14_F$.

The deallocation process can follow one of several scenarios as described below with regard to FIGS. 7-10.

Figure 7:
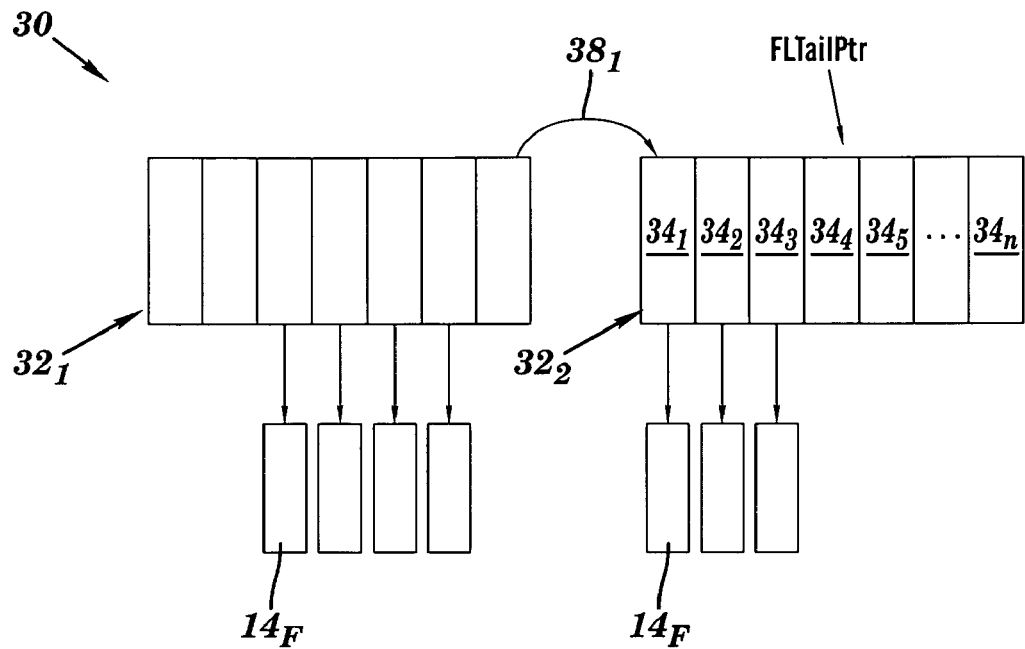
FIG. 7-8 illustrate the deallocation of a data block to the free list, wherein the tail pointer (FLTailPtr) points to an entry in the middle of an indirect list of the free list.
Figure 8:
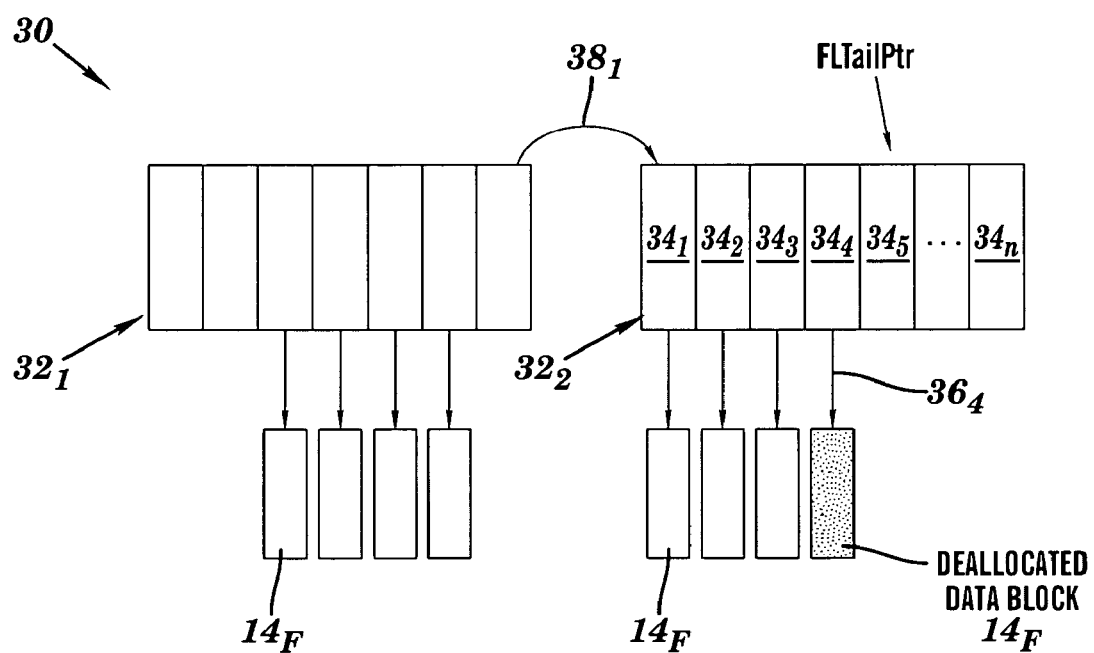

In FIG. 7, a first scenario is shown, wherein the tail pointer (FLTailPtr) points to an entry (i.e. entry $34_4$) in the middle of an indirect list (i.e., indirect list $32_2$) of the free list 30. The addition of a newly deallocated free data block $14_F$ to the free list 30, as illustrated in FIG. 8, involves updating entry $34_4$ such that it now points, via pointer $36_4$ to the newly deallocated free data block $14_F$, and moving the tail pointer (FLTailPtr) such that it points to the next entry $34_5$ in the same indirect list $32_2$.

Figure 9:
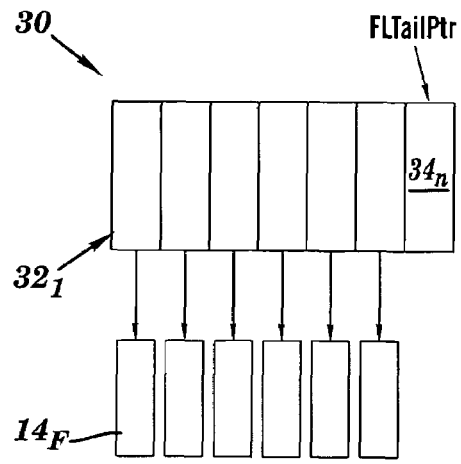
FIG. 9-10 illustrate the deallocation of a data block to the free list, wherein the tail pointer (FLTailPtr) points to the last entry of an indirect list in the free list.
Figure 10:
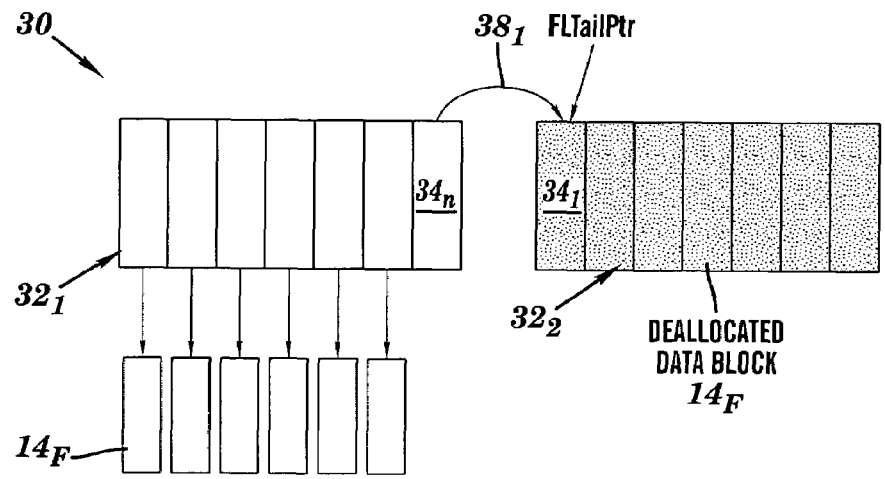

A second scenario is illustrated in FIG. 9. In this scenario, the tail pointer (FLTailPtr) points to the last entry (i.e. entry $34_n$) of an indirect list (i.e., indirect list $32_1$) of the free list 30. As shown in FIG. 10, a newly deallocated free data block $14_F$ is used as the next indirect list $32_2$ in the chain of indirect lists 32 that form the free list 30. The last entry $34_n$ in the indirect list $32_1$ is updated to point, via pointer $38_1$, to the newly deallocated free data block used as the next indirect list $32_2$, and the tail pointer (FLTailPtr) is moved to point to the first entry $34_1$ of the new indirect list $32_2$.

It should be noted that some number of recently deallocated free data blocks $14_F$ (e.g. 16) may be cached in registers, without returning them to the free list 30. This allows the cached free data blocks $14_F$ to be reused (allocated again) without first going to the free list 30, thereby increasing the performance of the allocation process. Such a cache 42 is shown schematically in FIG. 1.

As presented in detail above, two basic memory management operations are performed in accordance with the present invention: allocation of a free data block $14_F$ from the free list 30—either to become an allocated data block 14 or an indirect list 20; and, deallocation of an allocated data block 14 to the free list 30—either to become a free data block $14_F$ or an indirect list 32. These operations are used to place incoming TCP data 18 into the reassembly buffers 10, or to transfer the reassembled TCP data 18 from the allocated data blocks 14 to destination buffers.

Movement of the reassembled TCP data 18 from a reassembly buffer 10 is performed in order, based on the TCP sequence number (SN) of the TCP data. However, placement of TCP data 18 into a reassembly buffer 10 can be performed in any order, and this may create "holes" (i.e., not allocated entries 22) in the indirect list(s) 20 belonging to a reassembly buffer 10. This allows efficient use of memory resources without filling holes with not-yet-used data blocks 14.

To allow out-of-order placement of TCP data 18 in the reassembly buffer 10, the low level protocol (LLP) of the system needs to provide a byte sequence number and a data length identifying a data chunk (e.g., SN in TCP). That number is used both to find the entry in an indirect list 20 and an offset in a data block 14. Since all data blocks 14 have the same aligned size, and each reassembly buffer has a known number of indirect lists 20 (one in most cases), the entry 22 in indirect list 20 and offset in a data block 14 can be decoded from the sequence number. An example of this process is shown in FIG. 11.

Figure 11:
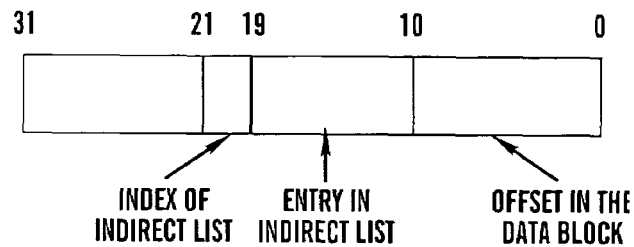
FIG. 11 illustrates sequence number decoding.

In FIG. 11, the data block 14 size is 2K and the reassembly buffer 10 includes a chain of four indirect lists 20. The maximum size of the reassembly buffer 10 is therefore limited to 4 MB. As shown, assuming a 32-bit SN, bits 20-21 hold the number of the indirect list 20, bits 10-11 hold the number of the entry 22 in the indirect list, and bits 0-10 hold the offset in the data block 14.

Although the dynamic memory management described above provides for a flexible and scalable system solution, one disadvantage is the performance degradation relative to static memory management schemes. To overcome this problem, the dynamic memory management of the present invention allows static allocation of the data blocks 14 to the reassembly buffers 10, on a per-reassembly buffer 10 basis, and this way allows for the creation of faster (i.e., static) reassembly buffers 10.

Each reassembly buffer 10 includes a bit 40 (e.g., set by the memory manager logic 16) indicating a mode in which the reassembly buffer 10 is to operate (i.e., either dynamic or static). Specifically, the bit 40 indicates whether the memory manager logic 16 should deallocate the data blocks 14 after the reassembled TCP data 18 has been moved to the destination buffers. In the dynamic memory management mode, a data block 14 is deallocated after all of the data from that block has been moved to the destination buffers, and then the data block is returned to the pool of free data blocks $14_F$ defined by the free list 30. In the static memory management mode, however, data blocks 14 are never deallocated. In particular, during initialization, the reassembly buffer 10 is provided with one or more indirect lists 20 with all entries 22 allocated. Since the data blocks 14 belonging to the reassembly buffer 10 are never deallocated, the reception of new TCP data 18 would never cause the allocation process to be performed. Therefore, in the static memory management mode, the process of allocation and deallocation of the data blocks 14 does not occur, making the reassembly buffer 10 faster than reassembly buffers 10 operating in the dynamic memory management mode: However, the hardware implementation would remain the same for both the dynamic and static memory management modes.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method for dynamically managing a reassembly buffer, comprising:
   providing a plurality of data blocks and an indirect list;
   pointing, via entries in the indirect list, to allocated data blocks in the plurality of data blocks that currently store incoming data;
   if a free data block in the plurality of data blocks is required for the storage of incoming data, allocating the free data block for storing incoming data;
   if an allocated data block in the plurality of data blocks is no longer needed for storing incoming data, deallocating the allocated data block such that the deallocated data block becomes a free data block; and
   selectively operating the reassembly buffer in a static mode by not deallocating allocated data blocks.

2. The method of claim 1, wherein the incoming data comprises TCP data.

3. The method of claim 1, further comprising a plurality of the indirect lists chained together.

4. The method of claim 3, wherein an entry in one of the plurality of indirect lists contains a pointer to another of the plurality of indirect lists.

5. The method of claim 1, wherein the plurality of data blocks comprises a pool of free data blocks, the method further comprising:
   allocating and deallocating free data blocks from the pool of free data blocks using a free list, wherein the free list includes entries each containing a pointer to a free data block.

6. The method of claim 5, wherein the free list comprises a plurality of indirect lists chained together to form a stack.

7. The method of claim 5, further comprising:
providing a cache of free data blocks that are allocated before the free data blocks in the free list.

8. The method of claim 6, wherein the free list comprises a head pointer for pointing to an entry, in one of the plurality of indirect lists forming the free list, containing a pointer to a next available free data block to be allocated.

9. The method of claim 8, wherein:
if the head pointer points to an entry that is not a last entry in one of the plurality of indirect lists forming the free list, that entry contains a pointer to the next available free data block to be allocated; and
upon allocation of the next available free data block, the head pointer is moved to point to the next entry in the same indirect list.

10. The method of claim 8, wherein:
if the head pointer points to a last entry in one of the plurality of indirect lists forming the free list, that last entry contains a pointer to a first entry in a next indirect list in the chain of indirect lists forming the free list; and
the indirect list containing the last entry becomes a next available free data block to be allocated, and the head pointer is moved to point to the first entry in the next indirect list in the chain of indirect lists forming the free list.

11. The method of claim 6, wherein the free list comprises a tail pointer for pointing to an entry, in one of the plurality of indirect lists forming the free list, that will be assigned a pointer to a next allocated data block to be deallocated.

12. The method of claim 11, wherein:
if the tail pointer points to an entry that is not a last entry in one of the plurality of indirect lists forming the free list, updating the pointer of that entry to point to the next allocated data block to be deallocated; and
moving the tail pointer to point to a next entry in the same indirect list.

13. The method of claim 11, wherein:
if the tail pointer points to a last entry in one of the plurality of indirect lists forming the free list, that last entry is updated to contain a pointer to a first entry in the next allocated data block to be deallocated, which becomes a next indirect list in the in the chain of indirect lists forming the free list; and
the tail pointer is moved to point to the first entry in the next indirect list in the chain of indirect lists forming the free list.

14. A method for storing out-of-order data segments in a reassembly buffer, comprising:
providing a plurality of data blocks and an indirect list having a plurality of entries;
providing each data segment with a sequence number, wherein the sequence number specifies which entry in the indirect list is to be associated with the data segment;
determining if any of the plurality of data blocks has already been allocated to the specified entry in the indirect list;
if a data block has already been allocated to the specified entry, storing the data segment in the allocated data block;
if a data block has not already been allocated to the specified entry, allocating a free data block for the storage of the data segment, and storing the data segment in the allocated free data block; and
selectively operating the reassembly buffer in a static mode by not deallocating allocated data blocks.

15. The method of claim 14, wherein the step of determining if any of the plurality of data blocks has been allocated to the specified entry in the indirect list comprises:
providing each entry in the indirect list with a bit that indicates the allocated/free status of the entry; and
examining the bit to determine if any of the plurality of data blocks has been allocated to the specified entry in the indirect list.

16. The method of claim 14, wherein the sequence number specifies an offset in the allocated data block for the storage of the data segment.

17. The method of claim 14, further comprising a plurality of indirect lists, wherein the sequence number specifies which of the plurality of indirect lists and which entry in the specified indirect list is to be associated with the data segment.

* * * * *